United States Patent Office 3,629,165
Patented Dec. 21, 1971

3,629,165
CONTROL OF POLYURETHANE FOAM PROCESS USING POLYSILOXANE POLYETHER COPOLYMER SURFACTANT
Norman G. Holdstock, Scotia, N.Y., assignor to General Electric Company
No Drawing. Original application May 31, 1962, Ser. No. 198,710. Divided and this application Aug. 25, 1969, Ser. No. 870,259
Int. Cl. C08g 22/46, 53/08
U.S. Cl. 260—2.5 AH
2 Claims

ABSTRACT OF THE DISCLOSURE

A polysiloxane polyether copolymer, wherein the polysiloxane chain is joined to the polyether chain through carboxy alkyl radicals, is used as a polyurethane foam additive. The carboxy alkyl groups are attached to the silicon atoms through Si—C bonds which enhances the hydrolytic stability of the copolymer. The copolymers are produced by reacting carboxy alkyl containing polysiloxanes with hydroxy stopped polyethers.

This application is a division of copending application Ser. No. 198,710, filed May 31, 1962.

This invention relates to organosilicon compounds and to uses thereof. More particularly, this invention is concerned with organosilicon compounds which are copolymers containing an organosilicon portion and a portion free of silicon and to the use of such materials in the production of polyurethane foams.

As will be discussed in more detail hereinafter, polyurethane foams are prepared by reacting certain complex polyols with various polyisocyanates, such as aromatic diisocyanates and aromatic triisocyanates, in the presence of water. The water reacts with the isocyanate groups, resulting in the release of carbon dioxide, which acts as a foaming agent for the reaction mixture, which cures as it foams. Polyurethane foams are formed by one of two general processes. In one of these processes, a prepolymer is formed by reacting some or all of the polyol with the polyisocyanate. This prepolymer is then further reacted with any remaining polyol and with water in the presence of certain surface active agents to produce the desired foam. In the other process, the polyurethane foam is formed in a single step from the monomeric reactants, which comprise the polyol the polyisocyanate and water.

While it would be desirable to practice the one-step process instead of the two-step process involving the prepolymer, it is often found that satisfactory foams cannot be obtained with common surface active agents by the one-step process. Foams formed by this one-step process have suffered many disadvantages among which are non-reproducibility of density and non-uniform size cells. The art has long sought surface active agents useful in the one-step polyurethane foam process which would provide a reproducible, low density product of uniform cell size. One class of material which has proved advantageous in the one-step process are the organopolysiloxane materials described in Patent 2,834,748—Bailey et al. However, these materials exhibit certain difficulties in use in that they do not have as high a degree of stability as desired in the presence of polyisocyanates.

It is an object of the present invention to provide new and improve organosilicon compositions which are particularly useful in the preparation of polyurethane foams.

It is another object of the present invention to provide an improved process for the manufacture of polyurethane foams.

These and other objects of my invention are more fully described in the following detailed description and in the appended claims.

My invention is based on the discovery of a new class of liquid organopolysiloxane copolymers having the formula:

(1) 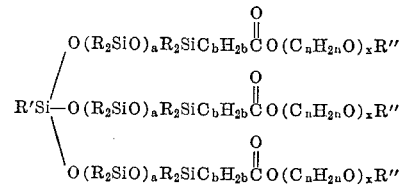

where R and R' are monovalent hydrocarbon radicals; R" is a lower alkyl radical; $a$ has a value of at least 2, e.g., from about 2 to 40 or more; $b$ has a value of from 2 to 3, inclusive; $n$ has a value of from 2 to 4, inclusive; and $x$ has a value of at least 5, e.g., from 5 to 100 or more. The compositions of Formula 1 are particularly characterized by the fact that no silicon-oxygen-carbon linkages are present. Each valence of silicon other than those forming part of a silicon-oxygen-silicon linkage, is satisfied by a silicon-carbon linkage. This characteristic of these products is believed to be the basis for their improved hydrolytic stability over prior art materials.

Among the radicals represented by R an R' in Formula 1 can be mentioned, for example, alkyl radicals, e.g., methyl, ethyl, propyl, butyl, octyl, etc. radicals; cycloalkyl radicals, e.g., cyclohexyl, cycloheptyl, etc. radicals; aryl radicals, e.g., phenyl, tolyl, naphthyl, xylyl, etc. radicals; aralkyl radicals, e.g., benzyl, phenylethyl, etc. radicals; alkenyl and cycloalkenyl radicals, e.g., vinyl, allyl, cyclohexenyl, etc. radicals; and halogenated radicals of the aforementioned type, e.g., chloromethyl, chlorophenyl, dibromophenyl, etc. radicals. As previously mentioned, the R" group is a lower alkyl radical, e.g., an alkyl radical containing from 1 to about 7 carbon atoms, such as methyl, ethyl, propyl, butyl, isobutyl, amyl, etc. radicals. In the preferred embodiment of my invention, both the R and R' radicals are alkyl or aryl radicals with the methyl and phenyl radicals being the specific preference.

The organosilicon compounds of Formula 1 can be prepared by the simple esterification of a liquid carboxy-alkyl-containing organopolysiloxane having the formula:

(2) 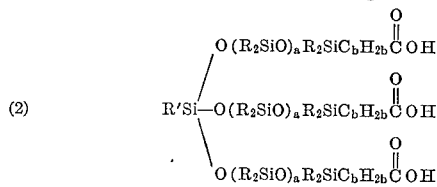

with a liquid polyalkylene glycol monoether having the formula:

(3)     $HO(C_nH_{2n}O)_xR''$ where R, R' and R", $a$, $b$, $n$ and $x$ are as previously defined.

The carboxyalkyl-containing organopolysiloxane of Formula 2 are described and claimed in my copending application, Ser. No. 198,725, now U.S. Pat. No. 3,182,076, filed concurrently herewith and assigned to the same assignee as the present invention. These materials can be readily formed by the hydrolysis and condensation of a mixture of an organotrichlorosilane having the formula:

(4)     $R'SiCl_3$ a diorganodichlorosilane having the formula:

(5)     $R_2SiCl_2$ and a cyanoalkyldiorganochlorosilane having the formula:

(6)     $R_2Si(Cl)C_bH_{2b}CN$ where R, R' and $b$ are as previously defined.

During the hydrolysis and condensation of the reactants of Formulae 4 through 6, the various silicon-bonded chlorine atoms are replaced by silicon-bonded hydroxyl groups which intercondense to form siloxane linkages and the nitrile radical hydrolyzes to a carboxyl radical.

The cyanoalkyldiorganochlorosilanes of Formula 6 are prepared by effecting reaction between a diorganochlorosilane having the formula:

(7) $\qquad R_2SiHCl$ where R is as previously defined and either acrylonitrile, methacrylonitrile or allyl cyanide in the presence of a suitable catalyst. Processes for producing compositions within the scope of Formula 6 are known in the art and are described, for example, in Patents 2,906,764, 2,906,765 and 2,913,472. Illustrative of the diorganochlorosilanes within the scope of Formula 7 are dimethylchlorosilane, methylphenylchlorosilane, diphenylchlorosilane, ethylpropylchlorosilane, etc. Products within the scope of Formula 6 which can be prepared by reacting a diorganochlorosilane of Formula 7 with acrylonitrile, methacrylonitrile or allyl cyanide include, for example, dimethyl-beta-cyanoethylchlorosilane, methylphenyl - beta - cyanoethylchlorosilane, diphenyl-gamma-cyanopropylchlorosilane, methylcyclohexyl-beta-cyanopropylchlorosilane, etc. The cyanoalkyldiorganochlorosilanes of Formula 6 are characterized by the fact that the nitrile group is attached to a carbon atom which is at least one carbon atom removed from the silicon, i.e., the cyano group is beta or gamma with respect to the silicon atom.

Illustrative of the organotrichlorosilanes within the scope of Formula 4 and the diorganodichlorosilanes within the scope of Formula 5 which are cohydrolyzed and condensed with the diorganocyanoalkylchlorosilane of Formula 6 are methyltrichlorosilane, phenyltrichlorosilane, amylthichlorosilane, cyclohexyltrichlorosilane, vinyltrichlorosilane, benzyltrichlorosilane, dimethyldichlorosilane, methylphenyldichlorosilane, diphenyldichlorosilane, methylethyldichlorosilane, methylcyclohexyldichlorosilane, methylvinyldichlorosilane, etc.

To form the carboxyalkyl-containing organopolysiloxane of Formula 2, the organotrichlorosilane of Formula 4, the diorganodichlorosilane of Formula 5 and the diorganocyanoalkylchlorosilane of Formula 6 are mixed together in the proportions in which the siloxane units derived therefrom appear in the siloxane of Formula 2. This mixture is then added slowly to water with stirring so as to form a uniform mixture of the organochlorosilanes and water and so as to facilitate the hydrolysis and condensation of the silicon-bonded chlorine atoms and the hydrolysis of the nitrile groups to carboxyl groups.

In general, the amount of water employed in the hydrolysis and condensation is sufficient to hydrolyze all of the silicon-bonded chlorine atoms and sufficient to provide a solvent for the hydrogen chloride which results from the hydrolysis. Preferably, the amount of water is maintained at a sufficiently low value so as to provide a concentrated hydrogen chloride solution or even to be insufficient to dissolve all of the hydrogen chloride. Where the amount of water is insufficient to dissolve the hydrogen chloride generated, it is desirable to maintain the reaction mixture under pressure, such as a pressure up to about 50 pounds per square inch so as to avoid the loss of hydrogen chloride. In general, the amount of water employed is from about 0.75 to 1.25 parts by weight per part of the mixture of the three organochlorosilanes of Formula 4 through 6. The hydrolysis and condensation reaction is found to be exothermic and it is found that the temperature increases to a maximum in the range of about 70° C. during the course of the hydrolysis and condensation, which is effected in times of from about 1 to 6 hours.

After completion of the hydrolysis and condensation reaction, water and hydrogen chloride are stripped to yield a reaction mixture containing a precipitate of ammonium chloride from the hydrolysis of the nitrile group to the carboxyl group. This precipitate is filtered and the reaction mixture is then dried. In order to insure a uniform composition, the dried and filtered hydrolyzate is equilibrated with sulfuric acid. The conditions under which this equilibration are effected can vary within extremely wide limits. In general, satisfactory results are employed by adding from about 1 to 5 percent by weight of 86% sulfuric acid to the hydrolyzate and heating the reaction mixture at a temperature of from about 75 to 125° C. for a time of from about 1 to 3 hours. At the end of this time, the reaction mixture is cooled and washed with water until the wash water is neutral. This results in the siloxane composition of Formula 2.

While the method of forming the carboxyalkyl-containing organopolysiloxane of Formula 2 has been described with reference to the hydrolysis and condensation of a mixture of appropriate organochlorosilanes, it should also be pointed out that the product of Formula 2 can also be made by a rearrangement and condensation reaction involving polysiloxanes and alkoxysilanes. More particularly, for example, a composition within the scope of Formula 2 in which R is methyl, R' is phenyl and $b$ is equal to 2, can be prepared by the forming a reaction mixture of phenyltriethoxysilane, octamethylcyclotetrasiloxane, and 1,3-bis(beta-carboxyethyl)tetramethyldisiloxane and heating the reaction mixture in the presence of concentrated sulfuric acid. The proportions of the various reactants are selected so as to provide the various siloxane units in the ratios desired in the final product within the scope of Formula 2.

The organopolysiloxane copolymer of Formula 1 is formed by the esterification of the organopolysiloxane of formula 2 with the polyalkylene glycol monoether of Formula 3.

The polyalkylene glycol monoethers employed in the practice of the present invention are well known in the art. These materials are formed by reacting a monohydric alcohol of the formula R"OH with an alkylene oxide or a mixture of alkylene oxides. By controlling the reaction conditions during the reaction between the aforementioned monohydric alcohol and the alkylene oxide, the molecular weight of the polyalkylene glycol monoethers can be controlled. While any polyalkylene glycol monoether within the scope of Formula 3 can be employed in the practice of the present invention, it is preferred that the material contain at least 5 oxyalkylene units, i.e., $x$ of Formula 3 is equal to at least 5. However, in order to be most effective in the preparation of polyurethane foams, it is preferred that the polyalkylene glycol monoether have a molecular weight of from about 300 to 5,000. This corresponds generally to products within the scope of Formula 3 where $x$ has a value of from about 10 to 100.

As indicated by Formula 3, the polyalkylene glycol monoethers employed in the practice of the present invention contain oxyalkylene groups of from 2 to 4 carbon atoms. Included within these oxyalkylene groups are, for example, oxyethylene, oxypropylene-1,2, oxypropylene-1,3, oxybutylene-1,2, etc. The monoether of Formula 3 can contain a number of oxyalkylene groups which are identical to each other or the oxyalkylene groups can comprise a mixture of various types of oxyalkylene groups. In the preferred embodiment of my invention, the oxyalkylene groups are a mixture of oxyethylene and oxypropylene-1,2, preferably in equimolar amounts. One very useful polyalkylene glycol monoether is the monobutyl ether containing a mixture of oxyethylene and oxypropylene-1,2 groups. Many of the polyalkylene glycol monoethers employed in the practice of the present invention are described in Patents 2,425,755 and 2,448,644.

In preparing the organopolysiloxane copolymer of Formula 1, any conventional means of esterification can be employed. The proportions of the organopolysiloxane of Formula 2 and the polyalkylene glycol monoether of Formula 3 are selected so that three molecules of the monoether of Formula 3 are available for esterification with one molecule of the polysiloxane of Formula 2. By controlling the particular carboxyalkyl-containing organopolysiloxane of Formula 2 and the particular polyalkylene glycol monoether of Formula 3, the relative proportions of the silicone portion and polyoxyalkylene portion of the copolymer of Formula 1 are controlled. Preferably, the silicone portion of the copolymer comprises from about 5 to 60 percent of the total weight of the copolymer.

In one suitable method of forming the copolymers of Formula 1, the organopolysiloxane of Formula 2 and the polyalkylene glycol monoether of Formula 3 are mixed together in the presence of a suitable inert solvent and a catalyst and heated at the reflux temperature of the catalyst until esterification is effected. Suitable inert solvents include the hydrocarbon solvents such as benzene, toluene, xylene, mineral spirits, etc. The amount of solvent employed is not critical and may vary within extremely wide limits. Satisfactory results have been obtained by using from about 0.5 to 5 parts of solvent per par of the mixture of the polysiloxane of Formula 2 and the monoether of Formula 3. One extremely useful catalyst for the esterification reaction is p-toluene sulfonic acid. The amount of catalyst employed is not critical, with satisfactory results being obtained employing from about 0.1 to 5 percent by weight of the catalyst based on the weight of the reaction mixture. The reaction is continued until the esterification is complete, which, depending upon the reactants, takes from about 2 to 24 hours or more. After esterification is complete, the catalyst is neutralized with sodium bicarbonate and the solution is then filtered and the solvent is distilled from the reaction mixture, resulting in a copolymer within the scope of Formula 1 which is a clear, low viscosity fluid.

In using the organopolysiloxanes of the present invention as additives in the production of polyurethane foams, the organopolysiloxane of Formula 1 is added to the other ingredients of the polyurethane foam reaction mixture in proportions as described below. The polyurethane foam reaction mixture comprises three essential ingredients, namely, a polyisocyanate, a polyol, and water.

The polyisocyanates which are useful in the practice of the present invention are those well known polyisocyanates which are conventionally used in the manufacture of polyurethane foams. Generally speaking, these polyisocyanates contain at least 2 isocyanate groups per molecule, which are separated from each other by at least 3 carbon atoms, i.e., isocyanate groups are not on adjacent carbon atoms in the formulation. These polyisocyanates may be aromatic or aliphatic and can be characterized by the formula:

(8) 

where Y represents a polyvalent organic radical having a valence $c$ and where $c$ has a value of at least 2, and preferably from 2 to 3, inclusive. The number of isocyanate groups is, of course, equal to the number of free valences in the radical Y. In general, the radical Y consists preferably of carbon and hydrogen atoms only, but may also include oxygen atoms. Preferably, also, the radical Y is a mononuclear aromatic radical. Illustrative of the various polyisocyanates which can be employed in the practice of the present invention can be mentioned, for example, 2,4-toluene diisocyanate; m-phenylene diisocyanate; methylene-bis-(4-phenylisocyanate); 4 - methoxy-m-phenylene diisocyanate; 1,6-hexamethylene diisocyanate; 2,4,6-toluene triisocyanate; 2,4,4'-diphenylether triisocyanate; 2,6-toluene diisocyanate; 3,3'-bitolylene-4,4'-diisocyanate; diphenylmethane-4,4'-diisocyanate; 3,3'-dimethyldiphenylmethane-4,4'-diisocyanate; triphenylmethane triisocyanate; dianisidine diisocyanate, etc. In addition to using only a single isocyanate in the production of polyurethane foams, it is also contemplated that mixtures of various isocyanates can be employed. In fact, the preferred isocyanate material employed in the practice of the present invention is a mixture of 80% by weight of 2,4-toluene diisocyanate and 20% by weight of 2,6-toluene diisocyanate.

The polyols employed in the practice of the present invention are those polyols conventionally used in the manufacture of polyurethane foam products. Chemically, these materials fall into one of two general categories. The first is the hydroxy-containing polyester and the second is the hydroxy-containing polyether. The polyesters are conventionally formed by the reaction of a polyhydric alcohol with a dibasic acid. The polyhydric alcohol is employed in excess so that the resulting material contains free hydroxyl groups. Illustrative of the types of polyester polyol materials employed in the production of polyurethane foams are polyesters formed by the reaction between dibasic acids, such as adipic acid, with polyhydric alcohols such as ethylene glycol, glycerine, pentaerythritol, sorbitol and the like. In general, these polyester polyols are prepared so as to contain from 2 to about 6 hydroxyl groups per molecule.

The polyether polyols employed in the practice of the present invention for the manufacture of urethane foams can be subdivided into two types, the first of which is a polyalkylene glycol such as polyethylene glycol or polypropylene glycol or mixed polyethylene-polypropylene glycol. The second type is a polyoxyalkylene derivative of a polyhydric alcohol such as polyoxyalkylene derivatives of glycerine, a trimethylolethane, a trimethylolpropane, neopentyl glycol, sorbitol, etc. These materials are well known in the art and are prepared by effecting reaction between an alkylene oxide or a mixture of alkylene oxides and the polyhydric alcohol. One common type of material is prepared by reacting 1,2-propylene oxide with glycerine to form a triol containing 3 polyoxypropylene groups attached to the glycerine nucleus.

These polyester polyols and polyether polyols are characterized by molecular weights of the order of from about 350 up to 10,000 or more. The particular type of triol and its molecular weight are generally determined by the characteristics of the urethane foam and the economics involved. In general, either the polyester polyols or the polyether polyols can be used interchangeably in the manufacture of either rigid polyurethane foams, semi-rigid polyurethane foams or flexible polyurethane foams. The distinguishing characteristic of the materials which control the type of foam in which they are to be used is the molecular weight. In general, the polyol used in the formation of rigid foams has a molecular weight in the range of from about 350 to 600. Generally, these polyols are triols or higher polyols. For the manufacture of semi-rigid foams, the polyol has a molecular weight in the range of from about 600 to 2500 and is generally a triol. For the manufacture of flexible foams, the polyol has a molecular weight of the range of about 2500 up to about 10,000 and is a triol or a mixture of a triol and a diol.

While the polyisocyanate and the polyol are the essential ingredients in the polyurethane foam reaction mixture, these reaction mixtures often contain a number of other ingredients in minor proportions. One of the most common of these other ingredients is water. Water reacts with the isocyanate groups and results in the liberation of carbon dioxide which serves as a blowing agent. However, it is often impossible to form low density foams using the carbon dioxide generated in situ as the only blowing agent, since the generation of carbon dioxide also results in cross-linking of the foam. Sometimes excessive cross-linking will occur if sufficient water is added to the reaction mixture to generate the desired amount of carbon dioxide. Other times, because of the particular polyol and isocyanate employed in the reaction mixture, it is not desirable to employ any water, since any water induced generation of cross-linking will result in a foam which is too brittle.

Accordingly, in those cases where it is not desirable to add any water, or in those cases where it is not feasible to add the amount of water desired, the reaction mixture often includes a separate blowing agent, such as a low boiling inert liquid. The ideal liquid is one which has a boiling point slightly above room temperature, i.e., a temperature of about 20 to 25° C., so that the heat generated by the exothermic reaction between the hydroxyl groups and the isocyanate groups will warm the reaction mixture to a temperature above the boiling point of the liquid blowing agent and cause it to boil. Suitable blowing agents include alkanes having appropriate boiling points, but the most desirable blowing agent has been found to be trichlorofluoromethane, which is commercially available under the trade name Freon 11.

Other ingredients often found in polyurethane foam reaction mixtures are various catalysts. For example, it is often desirable to add a catalyst to facilitate the reaction between water present in the reaction mixture and isocyanate groups. A typical type of catalyst for this reaction is a tertiary amine catalyst. These amine catalysts are well known in the art, and include materials such as N-methylmorpholine, dimethylethanolamine, triethylamine, N,N'-diethylcyclohexylamine, dimethylhexadecylamine, dimethyloctadecylamine, dimethylcocoamine, dimethylsilylamine, N-cocomorpholine, triethylene diamine, etc.

To catalyze the reaction between the hydroxyl groups of the polyol and the isocyanate, polyurethane foam reaction mixtures often contain a catalyst comprising a metal salt of an organic carboxylic acid. Most often this curing agent is a tin salt such as tin stearate, dibutyl tin dilaurate, tin oleate, tin octoate, etc.

The proportions of the various components of the polyurethane foam reaction mixture may vary within wide limits as is well known in the art. When water is added to the reaction mixture, it is present in an amount sufficient to generate the amount of carbon dioxide desired. Generally, when water is employed it is present in an amount up to about 5 parts per 100 parts, by weight, of the polyol. The polyisocyanate is generally present in an excess over the amount theoretically required to react with both the hydroxyl groups of the polyol and any water present in the reaction mixture. Generally, the polyisocyanate is present in an excess equal to about 1 to 15 percent, by weight. When a tertiary amine catalyst is present in the reaction mixture, it is generally employed in an amount equal to from about 0.001 to 3.0 parts per 100 parts, by weight, of the polyol. When a metal salt curing agent is present, it is generally employed in an amount equal to from about 0.1 to 1.0 part per 100 parts, by weight, of the polyol. When a separate blowing agent is employed, it is generally employed in an amount equal to from about 5 to 25 parts per 100 parts, by weight, of the polyol.

When employing the organopolysiloxane copolymer of Formula 1 as an aid in the formation of polyurethane foams, the copolymer is generally present in an amount equal to from about 0.25 to 7.5 parts by weight based on 100 parts by weight of the polyol in the reaction mixture.

Polyurethane foams can be prepared by one of two general methods employing the organopolysiloxane copolymer of Formula 1. In the first, and preferred process, all of the reactants are rapidly mixed together and the reaction mixture is allowed to foam. After foaming has been completed, the resulting foam can be cured, if desired, by heating at elevated temperatures, e.g., a temperature of from about 75 to 125° C. for several hours. Alternatively, the foam may be stored at room temperature until complete cure has been effected in times of from 24 hours to 48 hours or more.

In one modification of the second process, a prepolymer is formed from the polyol and the polyisocyanate to give a prepolymer containing excess polyisocyanate. This prepolymer is then mixed with the other reactants such as water, tertiary amine catalyst, blowing agent, curing catalyst and polysiloxane copolymer and allowed to foam.

In another modification of the second process, the polyisocyanate and a portion of the polyol are reacted together to form a base resin. When foaming is desired, the remainder of the polyol as well as the other ingredients of the reaction mixture are added to the base resin and the mixture is stirred and allowed to foam. Again, curing can be effected at room temperature or at an elevated temperature.

Regardless of the foaming process in which the organopolysiloxane copolymer of Formula 1 is employed, and regardless of whether the components of the reaction mixture are such as to produce rigid foams, semi-rigid foams or flexible foams, the use of these organopolysiloxane copolymers results in foams having smaller and more uniform cell sizes than corresponding foams prepared from prior art materials.

Because of the complexity of the well known technology surrounding the manufacture of polyurethane foams of all types, no attempt will be made here to discuss the many variations in technique and formulations which can be employed. For further details on the technology of polyurethane foams, reference is made to the voluminous patent and technical literature on the subject, including Patent 2,901,445—Harris; "Polyurethane," Bernard A. Dombrow, Reinhold Publishing Corporation, New York (1957); "Polyurethanes, a Versatile Synthetic for a Dynamic Area," Polyurethane Associates (1956); "Urethane Applications Laboratory Memorandum No. 60," Apr. 28, 1961 by Wyandotte Chemicals Corporation, Research Division; "Polyurethane Foam Catalysts," Technical Bulletin No. B6-R4, June 1960, Armour Industrial Chemical Company; "Dabco," Data Bulletin No. 4, July 20, 1959, Houdry Process Corporation.

The following examples are illustrative of the practice of my invention and are not intended for purposes of limitation. All parts are by weight. Except where otherwise indicated, the toluene diisocyanate employed in the examples was a mixture of 80 percent by weight of the 2,4-isomer and 20 percent by weight of the 2,6-isomer.

The dimethyl - gamma - cyanopropylchlorosilane employed in the examples was prepared by charging 80 parts of allyl cyanide and 2 parts of a 5 percent by weight platinum-on-charcoal catalyst to a reaction vessel and adding 88 parts of dimethylchlorosilane dropwise over a period of about 2 hours. During the addition of the dimethylchlorosilane the reaction temperature increased to about 100° C. The reaction mixture was then distilled at 25 millimeters and the condensate was fractionally distilled to yield a number of fractions including 51 parts of dimethyl-gamma-cyanopropylchlorosilane which boiled at 129° C. at 31 millimeters, which had a refractive index $n_d^{20}$ 1.4466 and which had a specific gravity of 0.9889. Elemental analysis of this material showed the presence of 8.99 percent nitrogen, 22.0 percent chlorine and 17.66 percent silicon as compared with the theoretical values of 8.66 percent nitrogen, 21.93 percent chlorine and 17.37 percent silicon.

The dimethyl-beta-cyanoethylchlorosilane employed in the examples was prepared by the Grignard alkylation of methyl-beta-cyanoethyldichlorosilane. Specifically, the Grignard reagent was employed in equimolar amounts as a methyl magnesium iodide solution in diethyl ether and heated at the reflux of the reaction mixture. The ether was stripped off and the reaction mixture was then fractionally distilled to yield the dimethyl-beta-cyanoethylchlorosilane which had a boiling point of 99° C. at 30 millimeters.

EXAMPLE 1

To about 2200 parts of water was slowly added with stirring a mixture of 150 parts methyltrichlorosilane, 1550 parts dimethyldichlorosilane and 480 parts of dimethylgamma-cyanopropylchlorosilane. The reaction mixture was maintained at a temperature of about 70° C. for two hours. The reaction mixture was then allowed to cool to room temperature and filtered to remove precipitated ammonium chloride and then heated at a temperature of about 110° C. to dry the reaction mixture. At this time, 42 parts of 86 percent sulfuric acid were added to the reaction mixture which was maintained for 2 hours at 100° C. At the end of this time, the reaction mixture was repeatedly washed with water until the wash water was neutral. This resulted in gamma-carboxypropyl-containing organopolysiloxanes within the scope of formula 2 having the formula:

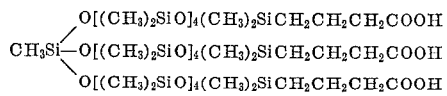

A copolymer within the scope of Formula 1 was prepared by mixing 140 parts of the previously prepared organopolysiloxane, 150 parts toluene, 1 part p-toluene sulfonic acid and 450 parts of the monobutylether of a mixed polyethylenepolypropylene - 1,2 glycol containing 50 weight percent polyoxyethylene groups and 50 weight percent oxypropylene groups. This reaction mixture was heated for about 4 hours at the reflux temperature of the toluene solvent and water was trapped from the distillate as formed. The resulting product was cooled, neutralized with sodium bicarbonate and filtered to remove solids. The reaction mixture was then heated to a temperature of about 150° C. at 10 millimeters to distill the toluene, resulting in a copolymer within the scope of the present invention which is a clear, colorless fluid having a viscosity of about 730 centipoises at 25° C. and which corresponds to the formula:

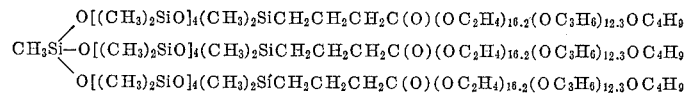

EXAMPLE 2

Following the procedure of Example 1, 140 parts of the gamma-carboxypropyl-containing organopolysiloxane of Example 1 was reacted with 750 parts of a monobutylether of a polyalkylene glycol in the presence of 1 part p-toluene sulfonic acid and 250 parts toluene to produce another copolymer within the scope of the present invention. The monobutylether was similar to that employed in Example 1, except that the monobutylether of the mixed polyethylenepolypropylene-1,2 glycol had a molecular weight of about 2500. The resulting product differed from the copolymer of Example 1 in that each oxyalkylene branch contained an average of about 26.6 oxyethylene groups and 21.0 oxypropylene groups. This material was a clear liquid having a viscosity of about 1500 centipoises at 25° C.

EXAMPLE 3

The procedure of Example 1 was repeated except that the reaction mixture employed to prepare a copolymer within the scope of the present invention contained 120 parts of the gamma-carboxypropyl-containing organopolysiloxane of Example 1, 225 parts of a monomethylether of a polyethylene glycol having a molecular weight of 750, 1 part of p-toluene sulfonic acid and 100 parts toluene. The resulting copolymer is equivalent to the copolymer of Formula 1 when R, R' and R" are methyl, $a$ is 4, $b$ is 3, $n$ is 2 and $x$ is 16.3. This material was a water-soluble waxy solid having a melting point about 40° C.

EXAMPLE 4

Following the procedure of Example 1, a gamma-carboxypropylpolysiloxane within the scope of Formula 2 was prepared by slowly adding a mixture of 150 parts of methyltrichlorosilane, 2600 parts dimethyldichlorosilane and 480 parts of dimethyl-gamma-cyanopropylchlorosilane to 3000 parts water. The resulting hydrolyzate was then filtered and dried and equilibrated with 100 parts of 87 percent sulfuric acid, and washed with water until the wash water was neutral. The resulting product was a composition within the scope of Formula 2 in which R and R' are methyl, $a$ has an average value of 6.7 and $b$ has a value of 3. A copolymer within the scope of the present invention was prepared by the method of Example 1 employing 195 parts of the above gamma-carboxypropyl-containing organopolysiloxane, 450 parts of the monobutylether of the mixed polyethylene-polypropylene glycol having a molecular weight of about 1500 as described in Example 1, 1 part of p-toluene sulfonic acid and 200 parts toluene as a solvent. The resulting copolymer is a clear white fluid having a viscosity of about 920 at 25° C. and corresponding to the formula:

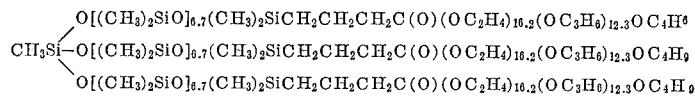

EXAMPLE 5

Following the procedure of Example 4, a copolymer within the scope of the present invention was prepared by reacting 195 parts of the gamma-carboxypropylpolysiloxane of Example 4 with 750 parts of the monobutylether of Example 2 having a molecular weight of about 2500, 300 parts toluene and 2 parts p-toluene sulfonic acid. The resulting product was identical in structure to that of Example 4, except that the monobutylether-glycol portions contained an average of 26.6 oxypropylene and 21.0 oxyethylene groups per chain. This material had a viscosity of 1700 at 25° C. and was a clear, colorless oil.

EXAMPLE 6

The procedure of Example 5 was followed to prepare a copolymer within the scope of Formula 1 by reacting 195 parts of the carboxypropylpolysiloxane of Example 4, 225 parts of the polyethylene glycol monomethylether of Example 3 which had a molecular weight of 750, 200 parts toluene and 1 part p-toluene sulfonic acid. This resulted in a copolymer within the scope of Formula 1 in which R, R' and R" are methyl, $a$ has a value of 6.7, $b$ has a value of 3, $n$ is 2 and $x$ is 16.3. This product was a water-soluble waxy solid having a melting point of about 40° C.

EXAMPLE 7

Following the procedure of Example 1, a mixture of 150 parts methyltrichlorosilane, 3900 parts dimethyldichlorosilane and 480 parts of dimethyl-gamma-cyanopropylchlorosilane were slowly added to 4500 parts of water with stirring. The reaction mixture was maintained at an elevated temperature for several hours, the ammonium chloride precipitate was filtered, the filtrate was dried and equilibrated with 100 parts of 87% sulfuric acid and washed with water until the wash water was neutral. This resulted in a gamma-carboxypropylpolysiloxane within the scope of Formula 2 in which R and R' are methyl, $a$ is 30 and b is 3. A copolymer within the scope of Formula 1 was prepared by the precedure of Example 1, by reacting 270 parts of the above carboxypropylpolysiloxane with 450 parts of the 1500 molecular weight monobutylether of the polyethylene-polypropylene glycol of Example 1, 400 parts toluene and 3 parts p-toluene sulfonic acid. This resulted in a copolymer which was a clear, white liquid having a viscosity of 1500 centipoises at 25° C. and which corresponded to the formula:

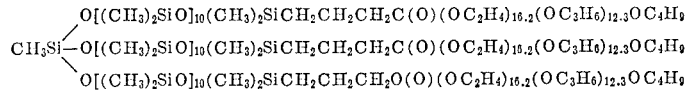

and R' are methyl, a has a value of 6.7 and b is equal to 2. Following the procedure of Example 1, 190 parts of this beta-carboxyethylpolysiloxane was reacted with 450 parts of the polyethylene-polypropylene glycol monobutylether of Example 1 in the presence of 300 parts toluene and 2 parts p-toluene sulfonic acid. This resulted in a copolymer within the scope of Formula 1 which was a clear, colorless oil having a viscosity of 900 centipoises at 25° C. and which corresponded in structure to the copolymer of Example 5, except that the carbonyl groups were attached to silicon through ethylene groups instead of through propylene groups as in Example 4.

EXAMPLE 8

Following the procedure of Example 7, a copolymer within the scope of the present invention was prepared by reacting 270 parts of the carboxypropylpolysiloxane of Example 7 with 750 parts of the 2500 molecular weight monobutylether of the mixed polyethylene glycol of Example 2 in the presence of 500 parts toluene and 5 parts p-toluene sulfonic acid to form a copolymer identical to that of Example 7, except that there were present approximately 26.6 oxypropylene and 21.0 oxyethylene groups in each of the monobutylether chains. This material was a clear fluid having a viscosity of 2800 centipoises at 25° C.

EXAMPLE 9

Following the procedure of Example 7, a copolymer was prepared by reacting 270 parts of the carboxypropylpolysiloxane of Example 7 with 225 parts of the polyethylene glycol monomethylether of Example 3 which had a molecular weight of 750, 200 parts toluene and 2 parts p-toluene sulfonic acid. This resulted in a copolymer within the scope of Formula 1 where R, R' and R'' are methyl; a has a value of 10, b is equal to 3, n is equal to 2 and x has a value of 16.2. This material was a water-soluble waxy solid having a melting point of about 40° C.

EXAMPLE 10

Following the procedure of Example 1, a copolymer within the scope of the present invention was prepared by reacting 195 parts of the carboxypropylpolysiloxane of Example 4 with a mixture of polyalkylene glycol monobutylethers having an average molecular weight of about 1800 in the presence of 500 parts toluene and 4 parts p-toluene sulfonic acid. The mixture of monobutylethers was a mixture of a 70 percent by weight first monobutylether of a mixed polyethylene-polypropylene-1,2 glycol having a molecular weight of about 1300 and a 30 percent by weight second monobutylether of a polyethylene-polypropylene-1,2 glycol having a molecular weight of about 2700. The resulting material was a white liquid having a viscosity of about 1000 centipoises at 25° C. and corresponded to the average formula:

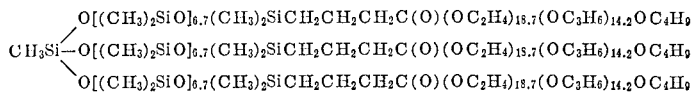

EXAMPLE 11

Following the procedure of Example 1, a betacarboxyethylpolysiloxane within the scope of Formula 2 was prepared by slowly adding a mixture of 150 parts methyltrichlorosilane, 2600 parts dimethyldichlorosilane and 440 parts dimethyl-beta-cyanoethylchlorosilane to 3000 parts water. After about 3 hours at 75° C., the precipitated ammonium chloride was filtered, the filtrate was dried and equilibrated with 75 parts of 87% sulfuric acid and washed with water until the wash water was neutral. This resulted in a material within the scope of Formula 2 in which R

EXAMPLE 12

Following the procedure of Example 1, a gamma-carboxypropylpolysiloxane within the scope of Formula 2 is prepared by slowly adding a mixture of 210 parts of phenyltrichlorosilane, 2300 parts methylphenyldichlorosilane and 480 parts of dimethyl-gamma-cyanopropylchlorosilane to 3000 parts of water. The resulting reaction mixture is heated for several hours and the precipitated ammonium chloride is filtered. The filtrate is dried and contacted with 100 parts of 87% sulfuric acid and heated at 100° C. for 2 hours to equilibrate the mixture. The equilibrate is washed with water until the wash water is neutral to produce a gamma-carboxypropylpolysiloxane having the formula:

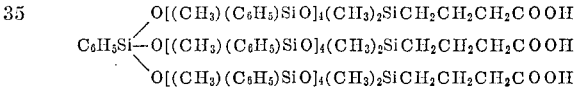

Again, following the procedure of Example 1, 220 parts of the beta-carboxypropylpolysiloxane described above is reacted with 225 parts of the 750 molecular weight polyethylene glycol monomethylether of Example 3 in the presence of 500 parts toluene and 5 parts p-toluene sulfonic acid to produce a copolymer corresponding to the formula:

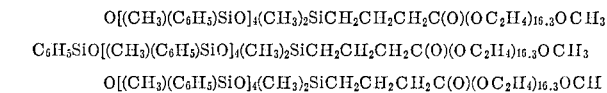

EXAMPLE 13

In order to evaluate the copolymers prepared in many of Examples 1 through 12, a number of polyurethane flexible one-shot foam formulations were made from (A) 100 parts of a triol having a molecular weight of 3000 and formed by reacting propylene oxide with glycerine to form 3 oxypropylene chains attached to the glycerine nucleus, (B) 0.3 part by weight of stannous octoate, (C) 38 parts by weight toluene diisocyanate, (D) 0.05 part triethylene diamine, (E) 0.4 part N-ethylmorpholine, (F) 2.9 parts water and (G) 0.5 part of one of the silicone copolymers of the preceding examples. In each case, the reactants were mixed together rapidly and allowed to foam in place. After foaming was completed, the foam was examined. In each case, the foam was a clear, white foam having a uniform cell size with the cells being relatively small. As a control, no copolymer was added to one portion of the formulation. In this case, no foam could be formed. The density of each of the foams was determined. In the table below are listed the densities of the control and the foams prepared using the copolymers of each of the preceding examples.

TABLE

| Copolymer: | Density (lbs./cu. ft.) |
|---|---|
| Example 1 | 2.6 |
| Example 2 | 2.76 |
| Example 4 | 2.60 |
| Example 5 | 2.70 |
| Example 7 | 2.80 |
| Example 8 | 2.37 |
| Example 10 | 2.43 |
| Example 11 | 2.53 |

EXAMPLE 14

A flexible polyurethane foam was prepared from 45 parts of the triol reaction product of glycerine and propylene oxide described in Example 13, 35 parts of a polyol derived from 1,1,1-trimethylolpropane, 20 parts of a polypropylene glycol having a molecular weight of about 2000, 0.3 part stannous octoate, 42.9 parts toluene diisocyanate, 10.0 parts trichlorofluoromethane, 1.5 part of the organopolysiloxane copolymer of Example 10, 0.1 part triethylene diamine and 3.4 parts water. The trimethylolpropane derivative had a molecular weight of about 4500 and was prepared by reacting propylene-1,2 oxide with trimethylolpropane to form 3 polyoxypropylene groups which are terminated by hydroxy ethoxy groups. All of the ingredients of this reaction mixture were mixed together rapidly and allowed to foam. The resulting foam had a density of about 1.4 lbs./cubic ft., and contained small uniform cells.

EXAMPLE 15

A polyurethane foam formulation was prepared by the procedure of Example 2 from a mixture of 100 parts of the polyoxypropylene derivative of glycerine described in Example 13, 0.2 part stannous octoate, 47 parts toluene diisocyanate, 15 parts trichlorofluoromethane, 0.75 part of the organopolysiloxane copolymer of Example 10, 0.1 part of triethylene diamine and 3.7 parts water. Again, the resulting foam was a white material having uniform and small cells. The foam had a density of about 1.05 lbs./cu. ft.

EXAMPLE 16

A polyurethane foam mixture was formed from 100 parts of the polyoxypropylene derivative of glycerine described in Example 13, 0.5 part stannous octoate, 43 parts toluene diisocyanate, 15 parts trichlorofluoromethane, 1.0 part of the organopolysiloxane copolymer of Example 10, 0.15 part triethylene diamine and 3.4 parts water. This reaction mixture was rapidly stirred for a few seconds and allowed to foam. The resulting foam had uniformly small cells and had a density of 1.3 lbs./cu. ft.

EXAMPLE 17

A rigid polyurethane foam mixture was prepared by mixing 75.6 parts of a prepolymer prepared by reacting a hexol derived from sorbitol and propylene oxide and toluene diisocyanate in the ratio of 4.5 equivalents of toluene diisocyanate per equivalent of the hexol, 55.6 parts of the aforementioned hexol, 27.8 parts of a mixture of trichlorofluoromethane and triethylene diamine in the ratio of 34 parts of the halogenated methane to 0.8 part of the diamine and 0.8 part of the organopolysiloxane copolymer of Example 13. The hexol had a molecular weight of about 700 and contained 6 hydroxy chain-stopped polyoxypropylene groups attached to the sorbitol nucleus. This mixture was stirred rapidly for a few seconds and allowed to stand. The mixture foamed to a white, rigid polyurethane foam having small uniform cells and a core density of 2.16 lbs./cu. ft.

EXAMPLE 18

A rigid polyurethane foam was prepared by mixing 160 parts of a triol derived from phloroglucinol and propylene oxide, 15 parts of N,N,N',N'-tetrakis(2-hydroxypropyl)ethylene diamine, 1.2 part of dibutyl tin dilaurate, 137 parts of crude toluene diisocyanate containing about 80 percent diisocyanates in the ratio of 4 parts of 2,4-toluene diisocyanate and 1 part of 2,6-toluene diisocyanate, 57 parts of trichlorofluoromethane and 1.5 part of the organopolysiloxane copolymer of Example 13. This mixture was stirred rapidly for a few seconds and allowed to foam to a brownish-white rigid polyurethane foam having small, uniform cells and a core density of about 2.2 lbs./cu. ft. When the procedure of this example was repeated except that the copolymers of Examples 3, 6, 9 and 12 were used instead of the copolymer of Example 13, comparable results were obtained.

EXAMPLE 19

In order to evaluate the hydrolytic stability of the copolymers of the present invention, the copolymer of Example 4 was placed in an open container and exposed to ambient room conditions. Similar treatment was given to a fluid copolymer prepared by following the procedure of Example I(a) of Patent 2,834,748. At the end of 3 days, the copolymer of Patent 2,834,748 had gelled. On the other hand, the fluid copolymer of Example 4 remained unchanged at the end of 3 months. In the manufacture of polyurethane foams, it is often desirable to premix all of the ingredients of the foam except the polyisocyanate to form a masterbatch. This masterbatch is stored until ready for use at the time of use the polyisocyanate is added. In order to evaluate the utility of the copolymers of the present invention in such masterbatches, two masterbatches identical to that of Example 13 were prepared, but the toluene diisocyanate was omitted. In one case, the copolymer was that of Example 4 and in the other case, the copolymer was that of the aforementioned Patent 2,834, 748. After 48 hours in a sealed container, the masterbatch containing the copolymer of the patent contained gel particles which rendered it useless for foam manufacture. After 5 months in a sealed container, the masterbatch containing the copolymer of Example 4 was free of gel and made a satisfactory foam when mixed with toluene diisocyanate.

What I claim as new and desire to secure by Letters Patent of the United States is:

1. The process for forming polyurethane foams of improved properties which comprises effecting reaction between a polyisocyanate and a polyol in the presence of a blowing agent and an organopolysiloxane copolymer having the formula:

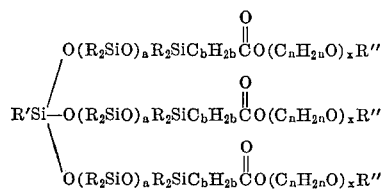

where R and R' are monovalent hydrocarbon radicals, R" is a lower alkyl radical, $a$ has a value of at least 2, $b$ has a value of from 2 to 3, inclusive, $n$ has a value of from 2 to 4, inclusive, and $x$ has a value of at least 5.

2. The process for preparing polyurethane foams of improved properties which comprises effecting reaction between a polyisocyanate and a polyol derived from a polyhydric alcohol and an alkylene oxide containing from 2 to 4 carbon atoms in the presence of a blowing agent and an organopolysiloxane copolymer having the formula:

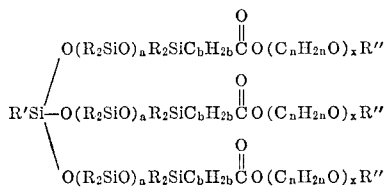

where R and R′ are monovalent hydrocarbon radicals, R″ is a lower alkyl radical, $a$ has a value of at least 2, $b$ has a value of from 2 to 3, inclusive, $n$ has a value of from 2 to 4, inclusive, and $x$ has a value of at last 5.

References Cited

UNITED STATES PATENTS

| 3,036,021 | 5/1962 | Trescher et al. |
| 3,168,543 | 2/1965 | Black et al. |
| 3,182,076 | 5/1965 | Holdstock. |
| 3,399,247 | 8/1968 | Windemuth et al. |

DONALD E. CZAJA, Primary Examiner

H. S. COCKERAM, Assistant Examiner

U.S. Cl. X.R.

260—18 TN